United States Patent
Palmer

(10) Patent No.: US 10,754,726 B2
(45) Date of Patent: Aug. 25, 2020

(54) TRACKING ERROR-CORRECTION PARITY CALCULATIONS

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 52 days.

(21) Appl. No.: 16/107,187

(22) Filed: Aug. 21, 2018

(65) Prior Publication Data
US 2020/0065186 A1 Feb. 27, 2020

(51) Int. Cl.
*G06F 11/10* (2006.01)
*G06F 16/901* (2019.01)

(52) U.S. Cl.
CPC ...... *G06F 11/1056* (2013.01); *G06F 11/1072* (2013.01); *G06F 16/901* (2019.01)

(58) Field of Classification Search
CPC .................................................. G06F 11/1056
See application file for complete search history.

(56) References Cited

U.S. PATENT DOCUMENTS

| | | | |
|---|---|---|---|
| 5,533,190 A * | 7/1996 | Binford | G06F 11/1084 714/6.21 |
| 5,883,909 A * | 3/1999 | DeKoning | G06F 11/10 714/800 |
| 6,151,641 A | 11/2000 | Herbert | |
| 6,446,237 B1 | 9/2002 | Menon | |
| 8,086,913 B2 * | 12/2011 | Houg | G11C 29/76 714/710 |
| 9,286,002 B1 * | 3/2016 | Karamcheti | G06F 3/0647 |
| 2004/0153479 A1 * | 8/2004 | Mikesell | G06F 16/182 |
| 2008/0109602 A1 | 5/2008 | Ananthamurthy et al. | |
| 2009/0287956 A1 * | 11/2009 | Flynn | G06F 11/1008 714/6.12 |
| 2012/0060049 A1 | 3/2012 | Uppala | |

(Continued)

FOREIGN PATENT DOCUMENTS

| | | |
|---|---|---|
| KR | 20150061258 | 6/2015 |
| WO | 2020041298 | 2/2020 |

OTHER PUBLICATIONS

"International Application Serial No. PCT US2019 047247, International Search Report dated Dec. 12, 2019", 3 pgs.

(Continued)

*Primary Examiner* — Steve N Nguyen
(74) *Attorney, Agent, or Firm* — Schwegman Lundberg & Woessner, P.A.

(57) ABSTRACT

Aspects of the present disclosure configure a memory sub-system to track error-correction parity calculations in the memory sub-system. For example, a memory sub-system controller of the memory sub-system can generate and use a first data structure to map one or more data chunks of an open data block to one or more buffers in a set of buffers for temporary storage of partial parity calculation results for the one or more data chunks, and generate and use a second data structure to map one or more data chunks of an open data block to one or more memory locations on non-volatile memory space (implemented by a set of memory components) for persistent storage of partial panty calculation results for the one or more data chunks.

20 Claims, 6 Drawing Sheets

(56) References Cited

U.S. PATENT DOCUMENTS

| 2014/0156966 A1* | 6/2014 | Ellis | G06F 3/064 |
| | | | 711/173 |
| 2014/0208156 A1* | 7/2014 | Muralimanohar | G11C 8/12 |
| | | | 714/6.24 |
| 2015/0103593 A1* | 4/2015 | Su | G11C 16/3422 |
| | | | 365/185.02 |
| 2018/0011762 A1* | 1/2018 | Klein | G06F 11/1072 |

OTHER PUBLICATIONS

"International Application Serial No. PCT US2019 047247, Written Opinion dated Dec. 12, 2019", 6 pgs.

* cited by examiner

TRACKING ERROR-CORRECTION PARITY CALCULATIONS

TECHNICAL FIELD

Embodiments of the disclosure relate generally to memory sub-systems and more specifically, to error-correction parity calculations in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
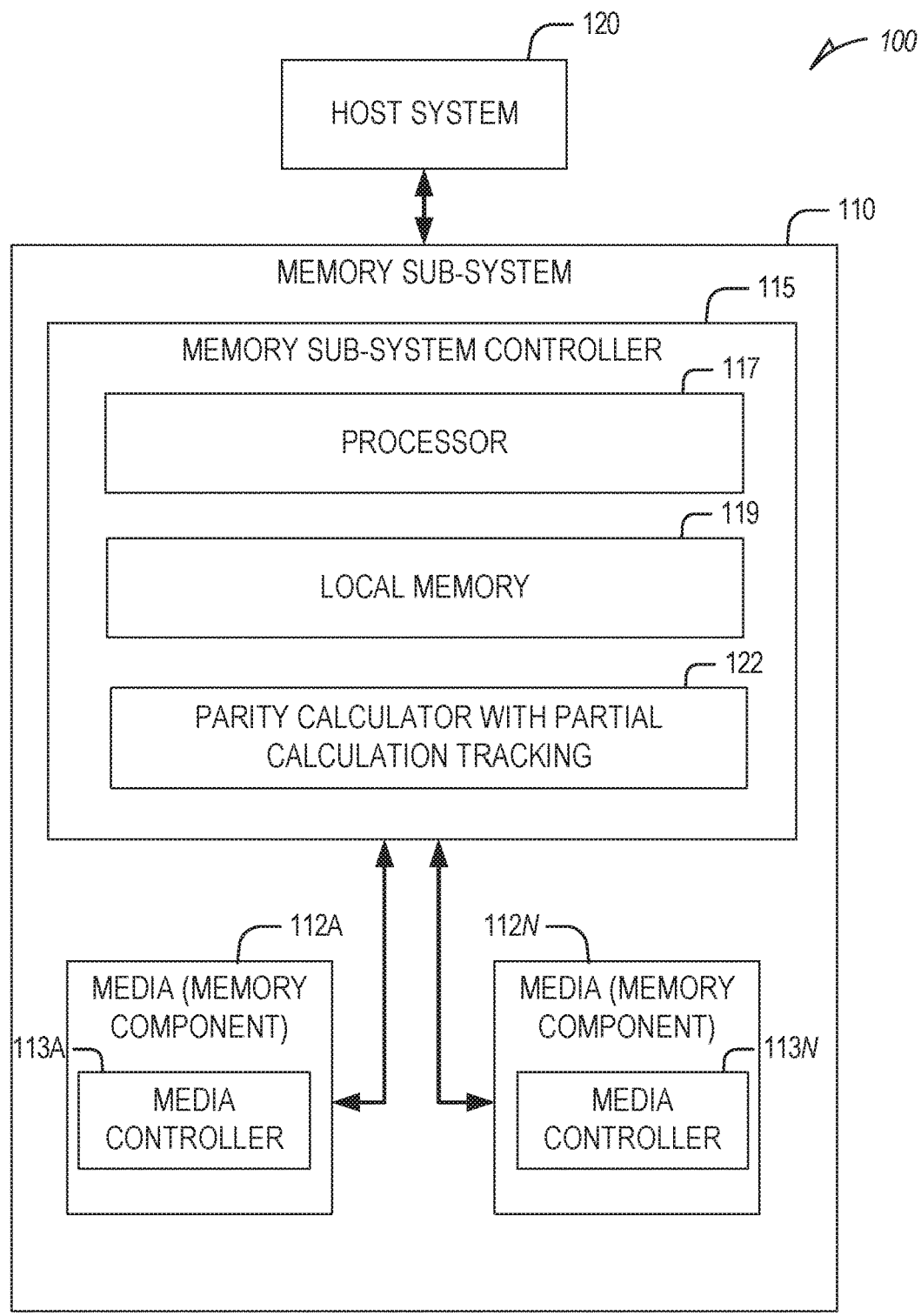
FIG. 1 is a block diagram illustrating an example computing environment including a memory sub-system, in accordance with some embodiments of the present disclosure.

Aspects of the present disclosure are directed to tracking error-correction parity calculations in a memory sub-system. A memory sub-system is also hereinafter referred to as a "memory device." An example of a memory sub-system is a storage system, such as a SSD. In some embodiments, the memory sub-system is a hybrid memory/storage sub-system. In general, a host system can utilize a memory sub-system that includes one or more memory components. The host system can provide data (e.g., via write requests) to be stored at the memory sub-system and can request data to be retrieved (e.g., via read requests) from the memory sub-system.

A memory sub-system can include multiple memory components that can store data from the host system. The memory sub-system can further include a memory sub-system controller that can communicate with each of the memory components to perform operations such as reading data, writing data, or erasing data at the memory components in response to requests received from the host system. Any one or more of the memory components of the memory sub-system may include a media controller to manage memory cells of the memory component, communicate with the memory sub-system controller, and execute memory requests (e.g., read or write) received from the memory sub-system controller.

In some applications, the memory sub-system controller can include buffer resources for maintaining parity calculation results when calculating parity values of a set of memory components, such as a set of NAND-type flash memory devices (hereafter, NAND devices), that form the data storage media of the memory sub-system. When the set of memory components comprise multi-plane NAND devices, such as triple-level cell (TLC) NAND devices, multiple (e.g., dozens of) parity calculations (running parity values, also referred to herein as partial parity calculation results) may need to be maintained in parallel to implement data protection (e.g., for user data) stored on the memory sub-system. Unfortunately, traditional memory sub-system controllers have finite buffer resources (e.g., comprising static random-access-memory (SRAM)) for maintaining multiple parallel partial parity calculation results and performing parity calculations based on those parallel partial parity calculation results. As a consequence, during operation, traditional memory sub-system controllers may need to temporarily cache at least one or more partial parity calculation results on the set of memory components of the memory sub-system, and swap those back to buffer resources as needed. As used herein, where all data chunks of an open data block have participated in a parity calculation, the parity calculation result that is generated for the open data block is considered a complete parity calculation result and ready for persistent storage on media in association with the open data block.

Aspects of the present disclosure address the above and other deficiencies by a system component, such as a memory sub-system controller of a memory sub-system, to track and manage storage of one or more partial parity calculation results, generated (calculated) for a data block of the set of memory components, on one or more buffer resources (e.g., buffer resources for parity calculations, also referred to herein as parity buffers) of the memory sub-system controller and on one or more persistent storage resources (e.g., non-volatile parity swap space) of the memory subsystem. In particular, the memory sub-system controller of some embodiments described herein generates (e.g., forms) and uses a set of first data structures (e.g., arrays) that track and link one or more open data blocks (e.g., open data blocks across one or more TLC NAND devices) to available buffers in a set of buffers (e.g., parity buffers). Such first tracking data structures can enable the memory sub-system controller to identify which buffers in the set of buffers (e.g., parity buffers) are in use and what partial parity calculation results those buffers are storing. As used herein, a data structure can include an array, of one or more dimensions, that can be used by various embodiments described herein as a lookup table.

Additionally, the memory sub-system controller of some embodiments described herein generates (e.g., forms) and uses a set of second data structures (e.g., arrays) that track and link one or more open data blocks (e.g., across one or more NAND devices) to non-volatile memory space on a set of memory components of the memory sub-system, such as reserved memory space (e.g., swap memory space) on the set of memory components separate from memory space on the set of memory components used to store user data. The reserved memory space, for example, may be implemented by one or more single-layer cell (SLC) NAND devices included by the set of memory components, while one or more TLC NAND devices included by the set of memory components are used to store user data. Compared to TLC NAND devices, SLC NAND devices can provider higher cycling and faster programming performance, making SLC NAND devices more suitable for users as swap memory space. The non-volatile memory space (e.g., reserved memory space) may be used by the memory sub-system controller to temporarily store (e.g., cache) partial parity calculation results from the set of buffers (e.g., parity buffers) to the non-volatile memory space when no buffers are available to store partial parity calculation results for parity calculation (e.g., exclusive OR (XOR) parity calculation) purposes. Subsequently, the partial parity calculation results temporarily stored (e.g., cached) on the non-volatile memory space can be swapped back to a buffer in the set of buffers based on availability and need, thereby limiting the amount of buffer resources need to actively maintain multiple partial parity calculation results. The second tracking data structures can enable the memory sub-system controller to associate non-volatile swap memory space used to maintain partial parity calculation results with open data blocks (e.g., open data blocks across one or more TLC NAND devices).

Furthermore, the memory sub-system controller of some embodiments described herein generates and stores metadata (e.g., according to a metadata scheme) that permits: easy identification of partial parity calculation results stored on non-volatile memory space (on the set of memory components of the memory sub-system) are valid; quick replay of missing partial parity calculation results in the event of unexpected power loss to the memory sub-system (which in turn enables a fast boot time for the memory sub-system); or both. In particular, the metadata may be stored in the non-volatile memory space (e.g., in association with the partial parity calculation results stored thereon) and may enable the memory sub-system controller to recover the set of first data structures (e.g., tracking arrays), the set of second data structures (e.g., tracking arrays), or both sets after the unexpected power loss. This, in turn, can enable quick power-on recovery of the memory sub-system and enable power-on recovery of the memory sub-system using very few memory sub-system resources.

According to some embodiments, the memory sub-system includes a set of memory components, such as a set of NAND devices (e.g., TLC NAND devices), for storing data and a memory sub-system controller that uses tracking storage and location of one or more partial parity calculation results, on non-volatile memory space (e.g., swap memory space), and on a set of buffers, as the partial parity calculation results are used to calculate parity for a data block of the set of memory components. Each memory component can include a different type of media. Examples of media include, but are not limited to, a cross-point array of non-volatile memory and flash-based memory, such as SLC NAND devices, TLC NAND devices, and quad-level cell (QLC) NAND devices. The memory sub-system controller can use data structures, such as arrays, to track and look up the storage location of valid partial parity calculation results with respect to the non-volatile memory space and the set of buffers. The data structures may be generated and stored by the memory sub-system controller on volatile memory of the memory sub-system controller, such as local memory of the memory sub-system controller that is separate from the set of buffers. Additionally, the memory sub-system controller can use metadata associated with the partial parity calculation results (e.g., stored on the non-volatile memory space in association with the partial parity calculation results) to enable recovery (e.g., reconstructions) of the data structures in the event the memory sub-system suffers unexpected power loss.

Depending on the embodiment, the parity calculation may comprise an exclusive OR (XOR) parity calculation, where an XOR operator is used to combine a new version of a data chunk of a data block with a running parity value (also referred to herein as partial parity value or partial parity calculation result) generated by a prior parity calculation performed on a prior version of the same data chunk.

For some embodiments described herein, the set of memory components comprises a plurality of NAND devices for storing user data, and the memory sub-system controller implements a redundant array of independent NAND devices (RAIN) protection scheme with respect to the plurality of NAND devices, which can protect user data stored on the plurality of NAND devices. For example, the RAIN protection scheme used may comprise a parity scheme having a stripe length (e.g., 7 data bits) that describes how many user data elements (e.g., user data bits) form a single stripe of user data (stored on the plurality of NAND devices) that is associated and protected by a single parity element (e.g., single parity bit). A given single parity element associated with and protecting a given stripe of user data may be calculated using an XOR parity calculation. Where the plurality of NAND devices comprises multi-plane NAND devices, such as TLC NAND devices, each plane may participate in a separate XOR parity calculation, thereby providing multi-plane failure detection and enabling the memory sub-system controller to independently rebuild each plane using parity data.

Disclosed herein are some examples of memory sub-systems that perform operations relating to tracking partial parity calculation results.

FIG. 1 illustrates an example computing environment 100 including a memory sub-system 110, in accordance with some examples of the present disclosure. The memory sub-system 110 can include media, such as memory components 112A to 112N. The memory components 112A to 112N can be volatile memory devices, non-volatile memory devices, or a combination of such. In some embodiments, the memory sub-system 110 is a storage system. An example of a storage system is an SSD. In some embodiments, the memory sub-system 110 is a hybrid memory/storage system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or a direct communicative connection (e.g., without intervening components), whether wired or wireless, including connections such as electrical, optical, magnetic, and so forth. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component can include both an SLC portion and an MLC portion of memory cells. Each of the memory cells can store one or more bits of data (e.g., data blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 bias been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory components 112A to 112N.

Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The memory sub-system 110 includes a parity calculator with partial calculation tracking 122 that can be used to track and manage storage of partial parity calculation results with respect to a set of buffers and non-volatile memory space (e.g., swap memory space) on one or more of the memory components 112A to 112N. In some embodiments, the controller 115 includes at least a portion of the parity calculator with partial calculation tracking 122. For example, the controller 115 can include a processor 117 (processing device) configured to execute instructions stored in local memory 119 for performing the operations described herein. In some embodiments, the parity calculator with partial calculation tracking 122 is part of the host system 120, an application, or an operating system.

For some embodiments, the set of buffers tracked by the parity calculator with partial calculation tracking 122 and storing one or more partial parity calculation results may be part of the memory sub-system controller 115, such as the local memory 119. Depending on the embodiment, the set of buffers may comprise RAM, such as SRAM, that is divided into the set of buffers according to a particular data chunk size (e.g., based on a storage scheme, such as a RAIN scheme) and assigned a buffer identifier (ID) (e.g., a single byte ID that allows for up 255 buffers identified by a ID range of 1 to 255, an ID of 0 to indicate a lack of an identifier/mapping in the first data structure).

The parity calculator with partial calculation tracking 122 can track memory locations of one or more partial parity calculation results stored on a set of buffers (e.g., parity buffers) using a first data structure (e.g., a first array) as a lookup table, and track memory locations of one or more partial parity calculation results stored on non-volatile memory space (e.g., corresponding to one or more of the memory components 112A to 112N) using a second data structure (e.g., a second array) as another lookup table. For some embodiments, the parity calculator with partial calculation tracking 122 generates a first data structure and a second data structure for each open data block (of media storage) on the memory components 122A to 122N accepting data for storage (e.g., block open for the memory sub-system controller 115 to write data). Once generated, at least one of the first data structure or the second data structure, or both, may be stored on the local memory 119 (on the embedded memory configured to store).

The first data structure of a given open data block may identify how each user data chunk of the given open data block (at a data chunk position in the given open data block) is mapped to a partial parity calculation result stored in at least one buffer in the set of buffers. In particular, the first data structure can map each data chunk position, in the given open data block, to an identifier (e.g., ID value of 1 to 255) of a buffer in the set of buffers that holds a partial parity calculation result associated with the data chunk that corresponds to the data chunk position. Where a given data chunk position of the open data block does not have an associated partial parity calculation result stored in any buffer in the set of buffers, the given data chunk position may have a mapping representing the lack of a buffer identifier (e.g., ID of 0).

The second data structure of a given open data block may identify how each user data chunk of the given open data block is mapped to a partial parity calculation result stored on non-volatile memory space (e.g., swap memory space) on the memory components 112A to 112N. In particular, the second data structure can map each data chunk position, in the given open data block, to a physical page address of the non-volatile memory space on the memory components 112A to 112N where a partial parity calculation result, associated with the data chunk that corresponds to the data chunk position, is stored. A partial parity calculation result, stored on the non-volatile memory space with respect a given data chunk, can represent the partial parity calculation result that the given data chunk participated in from the last time the partial parity calculation result was written to the non-volatile memory space.

When a write is being performed by the memory sub-system controller 115, for each particular data chunk to be written to a particular open data block of at least one of the memory components 112A to 112N, the parity calculator with partial calculation tracking 122 can check the first data structure associated with the particular open data block to determine whether a partial particular calculation result associated with the particular data chunk is stored in one of the buffers in the set of buffers and, if so, the identifier of the buffer. If, based on the first data structure, the partial particular calculation result associated with the particular data chunk is determined to be stored in an identified buffer, the parity calculator with partial calculation tracking 122 can use the partial parity calculation result stored in the identified buffer to perform the parity calculation (e.g., XOR calculation) for the particular data chunk and send the particular data chunk to be written to the particular open data block. If the resulting parity calculation is a partial result (e.g., the data block in question is still open), the new partial parity calculation will be stored in the identified buffer, thereby overwriting the old partial parity calculation stored therein.

If, based on the first data structure, the partial particular calculation result associated with the particular data chunk is not determined to be stored in one of the buffers in the set of buffers, the parity calculator with partial calculation tracking 122 can use a second data structure associated with the particular open data block to determine a memory address (e.g., media address, such as a page address) of the non-volatile memory space (e.g., swap memory space) on the memory components 112A to 112N where a partial parity calculation result associated with the particular data chunk is stored. The parity calculator with partial calculation tracking 122 can check if there are any available buffers, in the set of buffers, to store the partial parity calculation result. If so, the partial parity calculation result can be stored into a selected available buffer, the first data structure is updated accordingly (e.g., to reflect storage of the partial parity calculation result in the selected available buffer), and the parity calculation (e.g., XOR calculation) can be performed using a partial parity calculation result loaded to the selected available buffer (as described above). Additionally, the particular data chunk can be sent for writing to the particular open data block.

If there are no available buffers, the parity calculator with partial calculation tracking 122 can select one of the unavailable buffers (e.g., least used, round robin, etc.) for use, the given partial parity calculation result stored in the selected unavailable buffer can be flushed to the non-volatile memory space, and the second data structure can be updated accordingly (e.g., updated with the memory address of where the given partial parity calculation result is stored on the non-volatile memory space). Subsequently, the partial parity calculation result can be loaded into a selected unavailable buffer, the first data structure is updated accordingly (e.g., to reflect storage of the partial parity calculation result in the selected unavailable buffer), and the parity calculation (e.g., XOR calculation) can be performed using a partial parity calculation result loaded to the selected available buffer (as described above). Additionally, the particular data chunk can be sent for writing to the particular open data block.

Additionally, the parity calculator with partial calculation tracking 122 can include metadata regarding the partial parity calculation results stored on non-volatile memory space of the memory components 112A to 112N so that in the event of an unexpected power loss (or some other operational issue) with respect to the memory sub-system 110 or the memory sub-system controller 115, the parity calculator with partial calculation tracking 122 can cause the memory sub-system controller 115 to recover and resume tracking memory locations of the one or more partial parity calculation results stored on the set of buffers and memory locations of the one or more partial parity calculation results stored on non-volatile memory space. Depending on the embodiment, the metadata for a particular partial parity calculation result (stored on the non-volatile memory space) may comprise at least one of: information identifying the open data block associated with the particular partial parity calculation result; information parity calculation within the open data block; or a memory address (e.g., page address) of where on the non-volatile memory space the last data chunk that participated in the partial parity calculation result is stored.

For some embodiments, the first and second data structures stored on the local memory 119 are lost upon unexpected power loss to the memory sub-system 110. When the memory sub-system 110 subsequently power-ups, the parity calculator with partial calculation tracking 122 can use metadata, stored on the non-volatile memory space with partial parity calculation results, to regenerate (e.g., restore) at least the second data structure for each open data block on the memory components 112A to 112N. In particular, for each given open data block, the parity calculator with partial calculation tracking 122 can re-initialize a first data structure (e.g., initialize an array with all 0s) for the given open data block and reinitialize a second data structure (e.g., initial another array that is empty) for the given open data block. With respect to each second data structure, the parity calculator with partial calculation tracking 122 can identify a last valid written data chunk (e.g., page) on the non-volatile memory space (e.g., swap memory space). Beginning at that that last valid written data chunk, the parity calculator with partial calculation tracking 122 can read backwards through the non-volatile memory space and check stored metadata to identify a particular open data block, a data chunk position within the particular open data block, and last memory address (e.g., page address) of a partial parity calculation result. If the entry for the data chunk position in the second data structure for the particular open data block is empty, the parity calculator with partial calculation tracking 122 can load the last memory address into the entry. Subsequently, the parity calculator with partial calculation tracking 122 continues this process of reading backwards in the non-volatile memory space until for all open data blocks: last valid partial parity calculation results (on the non-volatile memory space) for data chunk positions of those open data blocks are discovered; and the memory addresses of those discovered last valid partial parity calculation results are loaded into the second data structures of respective open data blocks.

For each given data block having written data (e.g., user data) on one or more of the memory components 112A to 112N, the parity calculator with partial calculation tracking 122 can start reading from the last recorded memory address (e.g., page address) for a data chunk (e.g., page) of the given data block and (starting from that memory address) determine data chunks (e.g., pages) that may have been written to the data block on the memory components 112A to 112N but for which the associated partial parity calculation result was lost on the unexpected power loss. Data chunks (e.g., pages) determined to be associated with partial parity calculation result that was lost on the unexpected power loss can be read and have a lost parity calculation operation can be performed to bring the partial parity calculation in fully synchronization with the data chunk written to the given data block.

Depending on the embodiment, the parity calculator with partial calculation tracking 122 may comprise logic (e.g., a set of machine instructions, such as firmware) or one or more components that causes the memory sub-system 110 (e.g., the memory sub-system controller 115) to perform operations described herein with respect to the parity calculator with partial calculation tracking 122. The parity calculator with partial calculation tracking 122 may comprise a tangible unit capable of performing operations described herein. Further details with regards to the operations of e parity calculator with partial calculation tracking 122 are described below.

Figure 2:
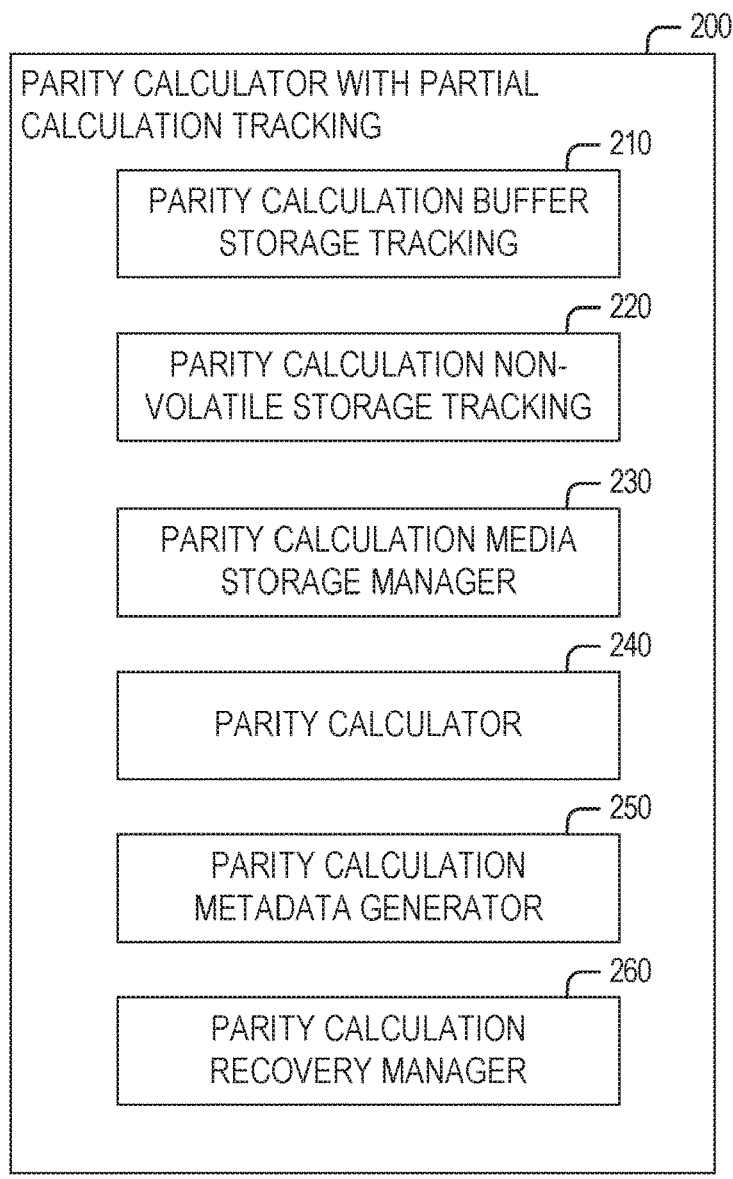
FIG. 2 is a block diagram of an example parity calculator with partial calculation tracking, in accordance with some implementations of the present disclosure.

FIG. 2 is a block diagram of an example parity calculator with partial calculation tracking 200, in accordance with some implementations of the present disclosure. As illustrated, the parity calculator with partial calculation tracking 200 comprises a parity calculation buffer storage tracker 210, a parity calculation non-volatile storage tracker 220, a parity calculation media storage manager 230, a parity calculator 240, a parity calculation metadata generator 250, and a parity calculation recovery manager 260. For some embodiments, the parity calculator with partial calculation tracking 200 may differ in components or arrangement (e.g., less or more components) than what is illustrated in FIG. 2.

The parity calculation buffer storage tracker 210 can create a first data structure, such as an array, for each open data block on a media (e.g., implemented by one or more memory components 112A to 112N). As noted herein, the first data structure for a given open data block can map a data chunk position in the given open data block corresponding to a data chunk (e.g., page) of the given open data block, to at least one buffer (e.g., buffer identifier) in a set of buffers used to store a partial parity calculation result associated with the data chunk.

The parity calculation non-volatile storage tracker 220 can create a second data structure, such as an array, for each open data block on a media (e.g., implemented by one or more memory components 112A to 112N). As noted herein, the second data structure for a given open data block can map a data chunk position in the given open data block, corresponding to a data chunk (e.g., page) of the given open data block, to a memory location in non-volatile memory space (e.g., swap memory space, which may be implemented on a SLC NAND device) used to store a partial parity calculation result associated with the data chunk.

The parity calculation media storage manager 230 can facilitate the loading of a partial parity calculation result from non-volatile memory space (e.g., swap memory space) to a buffer, flushing a partial parity calculation result from a buffer to non-volatile memory space, or writing a complete parity calculation result (e.g., all data chunks of an open data block have been processed and have participated in the parity calculation) to persistent storage on media (e.g., implemented by the memory components 112A to 112N).

The parity calculator 240 can perform a parity calculation on a data chunk of an open data block to produce a parity calculation result (e.g., partial or complete parity calculation result) for the open data block. As noted herein, the parity calculation performed on a data chunk of an open data block may comprise an XOR calculation.

The parity calculation metadata generator 250 can generate metadata in association with a partial parity calculation result that is stored on non-volatile memory space (e.g., swap memory space). As noted herein, the metadata for the particular partial parity calculation result may comprise at least one of: information identifying the open data block associated with the particular partial parity calculation result; information parity calculation within the open data block; or a memory address (e.g., page address) of where on the non-volatile memory space the last data chunk that participated in the partial parity calculation result is stored.

The parity calculation recovery manager 260 can facilitate power-on recovery of parity calculation tracking as described herein after a memory sub-system (e.g., 110) experiences an unexpected power loss. According to some embodiments, the parity calculation recovery manager 260 re-initializes a first data structure for each open data block of a media (e.g., implemented by the memory components 112A to 112N), re-initializes and restores a second data structure for each open data block of a media based on metadata and partial parity calculation results stored on non-volatile memory space (e.g., swap memory space), and determines and recovers partial parity calculation results that were lost on the unexpected power loss, which can be synchronized with data chunks already written to open data blocks.

Figure 3:
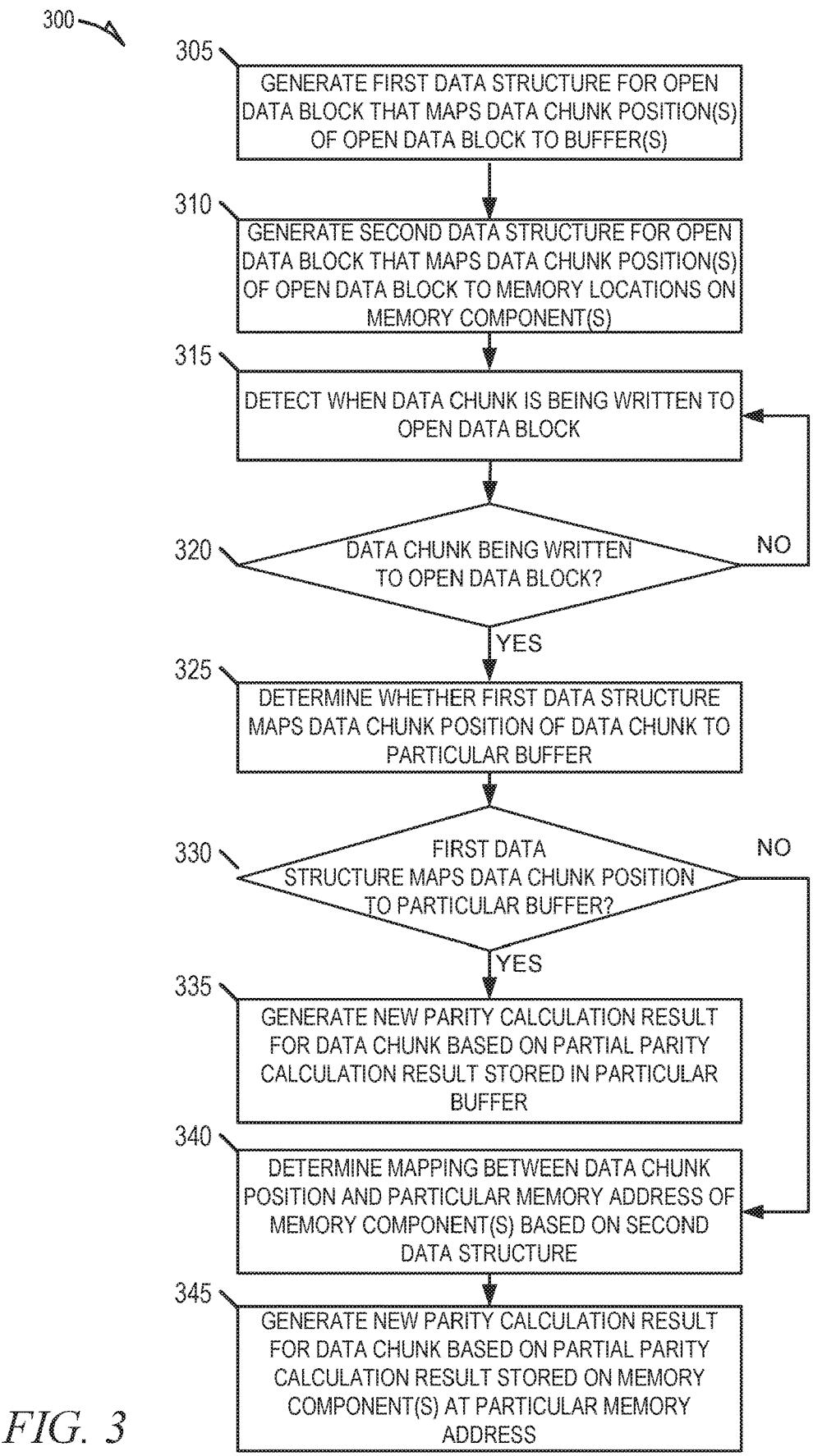
FIG. 3 is a flow diagram of an example method to perform parity calculation with partial calculation tracking, in accordance with some implementations of the present disclosure.

FIG. 3 is a flow diagram of an example method 300 to perform parity calculation with partial calculation tracking, in accordance with some implementations of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the memory sub-system controller 115 of FIG. 1. In these embodiments, the method 300 may be performed, at least in part, by the parity calculator with partial calculation tracking 122. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. For some embodiments, operations of the method 300 is performed with respect to two or more (e.g., all) data blocks on a set of memory components that are open for writing (also referred to herein as open data blocks) and with respect to two or more data chunks of those two or more data blocks.

At operation 305, a processing device of a memory sub-system (e.g., of processor of the memory sub-system controller 115) generates (e.g., initializes) a first data structure for a data block on the set of memory components, the data block being open for writing on the set of memory components, where the first data structure maps a set of data chunk positions, in the data block, to a set of buffers for storing one or more partial parity calculation results. As described herein, the set of memory components may comprise a set of NAND devices (e.g., TLC NAND devices) that implement media for persistent data storage of user data. For example, the first data structure may map a particular data chunk position in the data block, corresponding to a particular data chunk, to an identifier indicating which buffer in the set of buffers is storing a particular partial parity calculation result associated with the particular data chunk. As noted herein, once generated, the first data structure may be stored on a local memory (e.g., RAM) of a memory sub-system controller of the memory sub-system. Additionally, the set of buffers may be part of the memory sub-system controller and, more specifically, may also be part of the local memory of the memory sub-system controller. The first data structure can comprise an array or a table that represents a mechanism for tracking partial parity calculation results in connection with data chunks of the data block.

At operation 310, the processing device of the memory sub-system generates a second data structure for the data block, where the second data structure maps the set of data chunk positions to a set of memory addresses (e.g., page addresses) of the set of memory components, the set of memory addresses corresponding to memory locations on the set of memory components for storing partial parity calculation results. As described herein, the set of memory components may comprise a set of NAND devices (e.g., SLC NAND devices) that implement reserved non-volatile memory space (e.g., swap memory space) for persistent data storage of partial parity calculation results and metadata as described herein. This set of NAND devices for storing persistent parity calculation results may be separate from a set of NAND devices, in the set of memory components, used to store user data.

At operation 315, the processing device of the memory sub-system detects when a data chunk is being written to the data block that is open for writing on the set of memory components. At operation 320, if the processing device of the memory sub-system detects (at operation 315) that the data chunk is being written to the data block, the method 300 proceeds to operation 325 and, otherwise, the method returns to operation 315.

At operation 325, the processing device of the memory sub-system determines whether the first data structure comprises a mapping between a particular buffer in the set of buffers and a data chunk position, in the data block, at which the data chunk (detected at operation 315) is to be written. The method 300 then proceeds to operation 330. For some embodiments, operations 330 through 345 represent the processing device of the memory sub-system generating a new parity calculation result based on the processing device determining (at operation 325) whether the first data structure, comprises the mapping between the particular buffer in the set of buffers and the data chunk position.

At operation 330, if the processing device of the memory sub-system determines (at operation 325) that the first data structure comprises the mapping between articular buffer in the set of buffers and the data chunk position, the method 300 proceeds to operation 335 and, otherwise, the method proceeds to operation 340.

At operation 335, the processing device of the memory sub-system generates a new parity calculation result for the data chunk based on a partial parity calculation result stored on the particular buffer. As noted herein, the new parity calculation result may be generated by an XOR operation, whereby the data chunk to be written to the open data block and the partial parity calculation results are combined by an XOR calculation, thereby producing the new parity calculation result. For some embodiments, a single operation combines the data chunk with the current data content (e.g., the partial parity calculation result) of the particular buffer using an XOR operation and replaces the current data content with the resulting data (e.g., the new parity calculation result). Eventually, a parity calculation result may be complete (e.g., because all data chunks of the data block have participated in the parity calculation) and written to the media in association with the data block for persistent storage, or the partial parity calculation result stored in the particular buffer is flushed to the non-volatile memory space (e.g., implemented by the set of memory components) to make the particular buffer available for parity calculation for another data chunk.

At operation 340, the processing device of the memory sub-system determines, based on the second data structure, a mapping between the data chunk position and a particular memory address of the set of memory components.

At operation 345, the processing device of the memory sub-system generates a new parity calculation result for the data chunk based on a partial parity calculation result stored on the set of memory components at the particular memory address. To facilitate this, the processing device may load the partial parity calculation result from the set of memory components at the particular memory address to an available buffer in the set of buffers, and generate the new parity calculation result for the data chunk based on the partial parity calculation result loaded to the available buffer from the set of memory components. With respect to loading the partial parity calculation result from the set of memory components at the particular memory address to the available buffer in the set of buffers, the processing device may determine whether there are any available buffers in the set of buffers and in response to determining that there is an available buffer in the set of buffers, use the available buffer to load the partial parity calculation result from the set of memory components.

Alternatively, in response to determining that there are no available buffers in the set of buffers, the processing device may select an unavailable buffer in the set of buffers to be the available buffer, and flush a current partial parity calculation, associated with a second data chunk (possibly of a second open data block) and stored on the unavailable buffer, to the set of memory components at a given memory address. Once flushed, the unavailable buffer is now available for loading another partial parity calculation result and, as such, the processing device can load the partial parity calculation result from the set of memory components at the particular memory address to the newly available buffer. Additionally, the processing device can update the first data structure (associated with the open data block of the data chunk) to indicate a mapping between the data chunk and the newly available buffer. With respect to the second data chunk, the processing device can update a first data structure associated with the open data block of the second data chunk to indicate that the second data chunk is no longer mapped to the unavailable buffer, and can also update a second data structure associated with the second data chunk with a mapping between the given memory address and the other data chunk.

Whenever a partial parity calculation result is stored (e.g., flushed from buffer) to the non-volatile memory space, as described herein, metadata associated with the particular parity calculation result may be stored (or updated) on the non-volatile memory space in association with the partial parity calculation result. As noted herein, the metadata can enable a memory sub-system to recover first data structure (s), second data structure(s), or both after the memory sub-system experiences unexpected power loss. Example metadata may comprise at least one of: information identifying the open data block associated with the particular partial parity calculation result; information parity calculation within the open data block; or a Memory address (e.g., page address) of where on the non-volatile memory space the last data chunk that participated in the partial parity calculation result is stored. Though not illustrated, the processing device of the memory sub-system may determine (e.g., during power-up of the memory sub-system) whether the memory sub-system suffered an unexpected power loss and, in response to determining that an unexpected power loss was experienced, perform a recovery operation based on the stored metadata, as described herein.

Figure 4A:
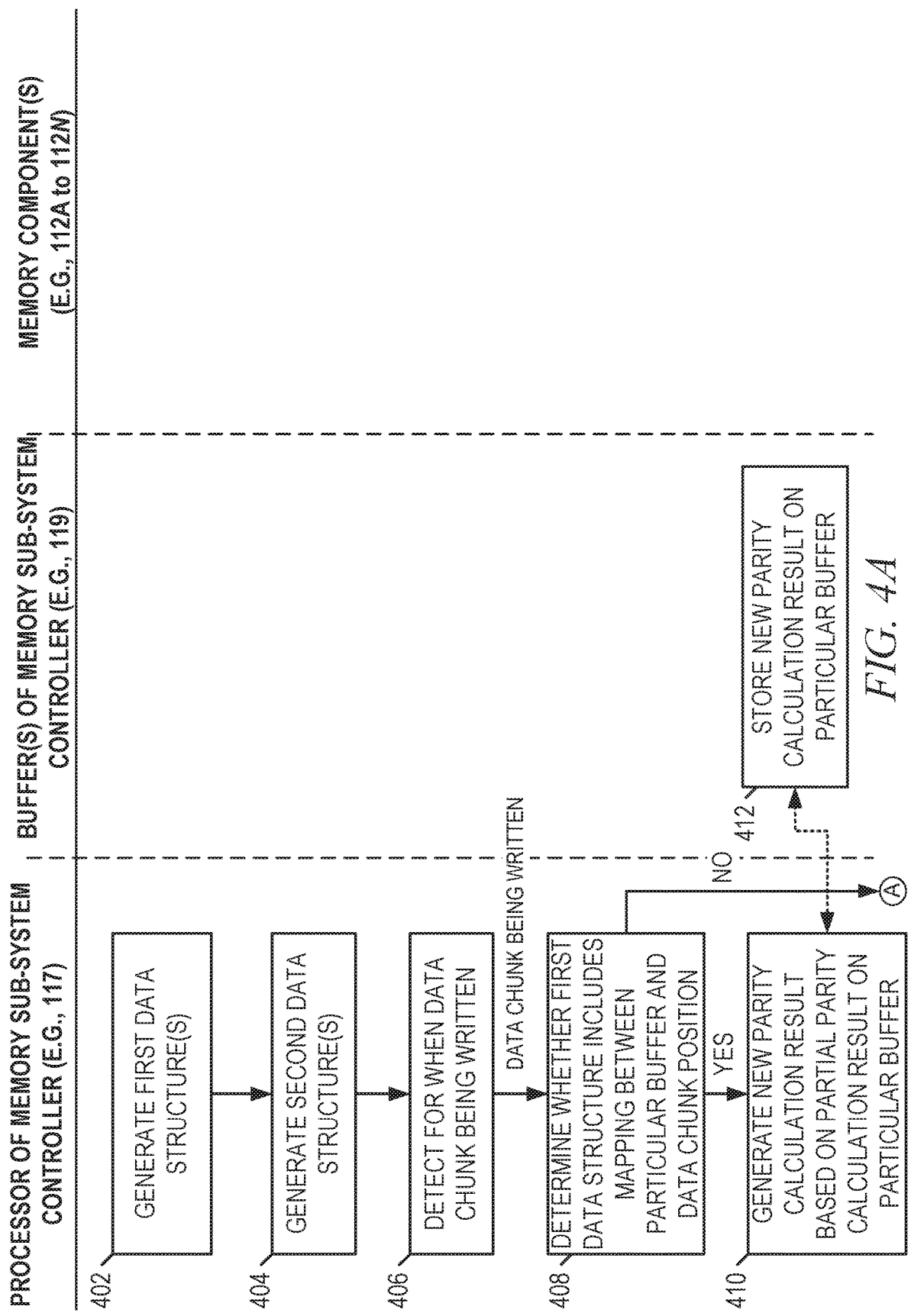
FIGS. 4A and 4B provide an interaction diagram illustrating interactions between components of a computing environment in the context of an example embodiment in which a method is used to perform parity calculation with partial calculation tracking.
Figure 4B:
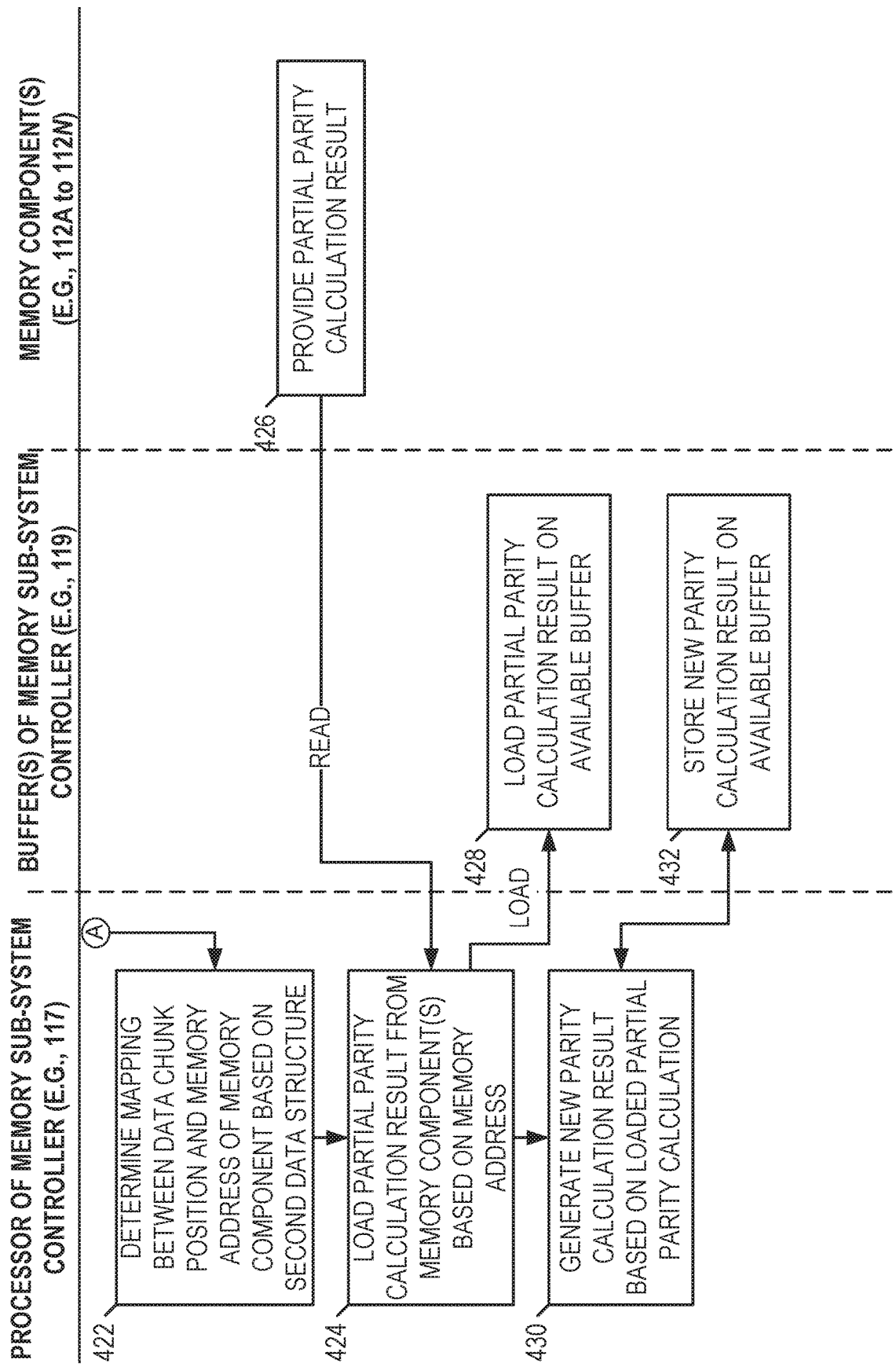

FIGS. 4A and 4B provide an interaction diagram illustrating interactions between components of the computing environment 100 in the context of an example embodiment in which a method to perform parity calculation with partial calculation tracking. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the memory sub-system controller 115. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIGS. 4A and 4B, the processor can comprise the processor 117 of the memory sub-system 110, the one or more buffers can be a part of the memory sub-system controller 115 (such as part of the local memory 119), and the one or more memory components may comprise at least one of the memory components 112A to 112N.

As shown, at operation 402, the processor of the memory subsystem generates a set of first data structures for one or more open data blocks on the memory component and, at operation 404, the processor generates a set of second data structures for the one or more open data blocks on the one or more memory components.

At operation 406, the processor detects for when a particular data chunk of a particular open data block is being written to the one or more memory components. In response to detecting that the particular data chunk is being written, at block 408, the processor determines whether a first data structure, in the set of first data structures and associated with the particular open data block, comprises a mapping between a particular buffer of the one or more buffers and a data chunk position in the particular open data block corresponding to the particular data chunk. If the first data structure comprises the mapping, at operation 410, the processor generates (e.g., by XOR calculation) a new parity calculation based on a particular parity calculation result stored on the particular buffer and, at operation 412, the particular buffer stores the new parity calculation result generated.

If the first data structure does not comprise the mapping, at operation 422, the processor determines a mapping, between the particular data chunk position and a memory address of the one or more memory components, based on a second data structure that is in the set of second data structures and that is associated with the particular open data block. At operation 424, the processor loads a partial parity calculation result from the one or more memory components based on the memory address identified by the mapping to an available buffer. In particular, at operation 424, the processor reads the partial parity calculation result from the one or more memory components based on the memory address. At operation 426, the one or more memory components provide the partial parity calculation result, and at operation 428, the available buffer loads the partial parity calculation result read from the one or more memory components by the processor. Subsequently, at operation 430 the processor generates (e.g., by XOR calculation) a new parity calculation based on the particular parity calculation result loaded to the available buffer and, at operation 432, the particular buffer stores the new parity calculation result generated.

Figure 5:
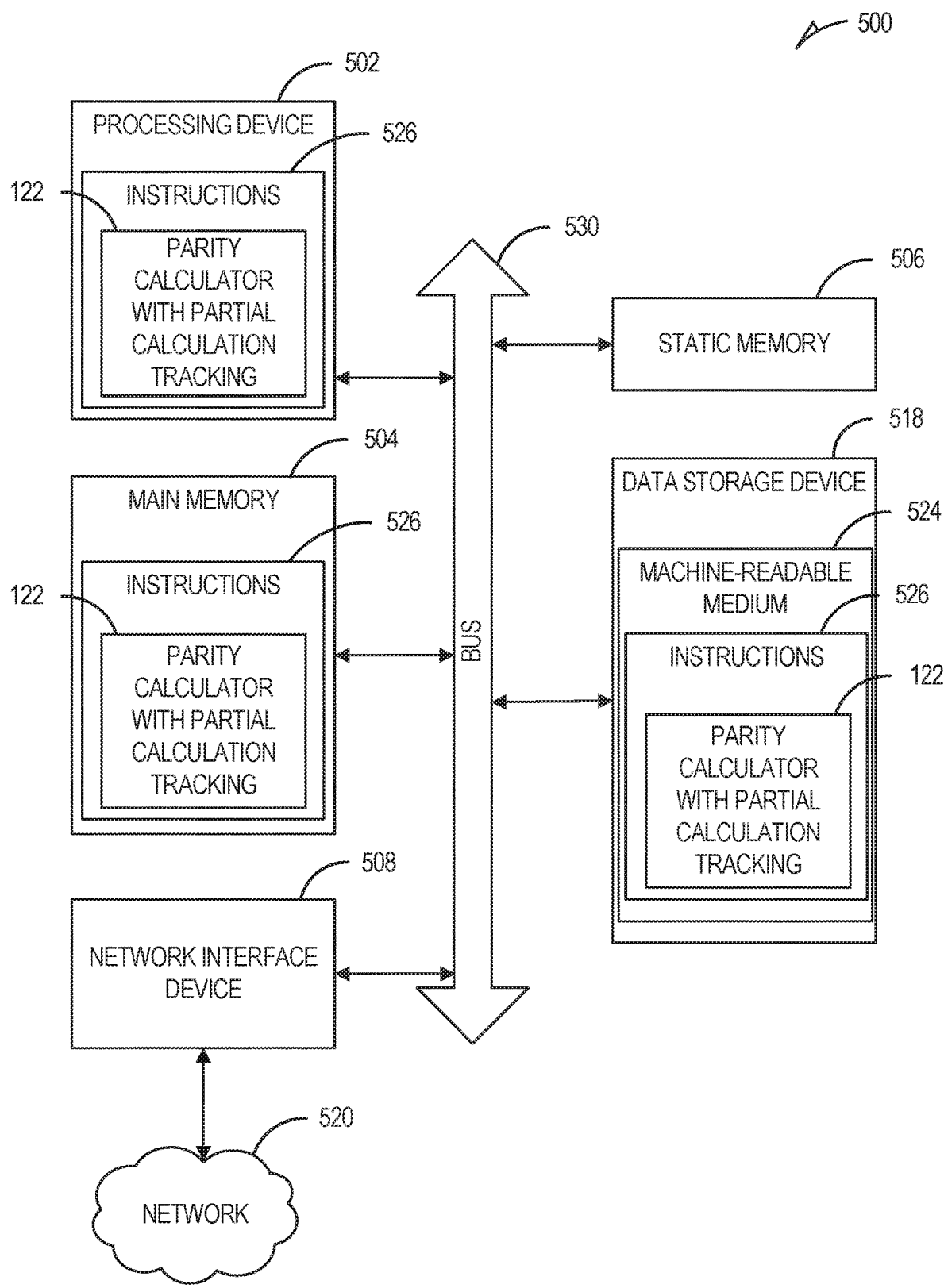
FIG. 5 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 5 illustrates an example machine in the form of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the parity calculator with partial calculation tracking 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a parity calculator with partial calculation tracking (e.g., the parity calculator with partial calculation tracking 122 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

EXAMPLES

Example 1 is a method comprising: generating a first data structure for a data block including a set of data chunk positions, the first data structure mapping the set of data chunk positions to a set of buffers for storing one or more partial parity calculation results, the data block being open for writing on a set of memory components, and the set of memory components being different from the set of buffers; detecting when a data chunk is being written to the data block; in response to detecting that the data chunk is being written to the data block, determining whether the first data structure comprises a mapping between a particular buffer in the set of buffers and a data chunk position, in the data block, at which the data chunk is to be written; and generating, by a processing device, a new parity calculation result based on the determining whether the first data structure comprises the mapping between the particular buffer and the data chunk position.

In Example 2, the subject matter of Example 1 optionally includes generating a second data structure for the data block, the second data structure mapping the set of data chunk positions to a set of memory addresses corresponding to memory locations on the set of memory components for storing partial parity calculation results, where the generating the new parity calculation result based on the determining whether the first data structure comprises the mapping between the particular buffer and the data chunk position comprises: in response to determining that the first data structure does not comprise the mapping between the particular buffer and the data chunk position: determining, based on the second data structure, a mapping between the data chunk position and a particular memory address of the set of memory components; and generating a new parity calculation result for the data chunk based on a partial parity calculation result stored on the set of memory components at the particular memory address.

In Example 3, the subject matter of Example 1 or Example 2 optionally includes where the generating the new parity calculation result based on the partial parity calculation result stored on the set of memory components at the particular memory address comprises: loading the partial parity calculation result from the set of memory components at the particular memory address to an available buffer in the set of buffers; and generating the new parity calculation result for the data chunk based on the partial parity calculation result loaded from the set of memory components.

In Example 4, the subject matter of any one of Examples 1 to 3 optionally includes where the loading the partial parity calculation result from the set of memory components at the particular memory address to the available buffer in the set of buffers comprises: determining whether there are any available buffers in the set of buffers; in response to determining that there are no available buffers in the set of buffers: selecting an unavailable buffer in the set of buffers to be the available buffer; flushing a current partial parity calculation, stored on the unavailable buffer, to the set of memory components at a given memory address, the current partial parity calculation being associated with another data chunk; updating a second data structure associated with the other data chunk with a mapping between the given memory address and the other data chunk; and loading the partial parity calculation result from the set of memory components at the particular memory address to the available buffer.

In Example 5, the subject matter of any one of Examples 1 to 4 optionally includes where the generating the new parity calculation result based on the determining whether the first data structure comprises the mapping between the particular buffer and the data chunk position comprises: in response to determining that the first data structure comprises the mapping between the particular buffer and the data chunk position, generating a new parity calculation result for the data chunk based on a partial parity calculation result stored on the particular buffer.

In Example 6, the subject matter of any one of Examples 1 to 5 optionally includes the memory locations for storing partial parity calculation results further store metadata for each particular partial parity calculation stored at the memory locations, and the method further comprises: determining whether a memory sub-system suffered an unexpected power loss; and in response to determining that the memory sub-system suffered the unexpected power loss, performing a recovery operation based on the stored metadata.

In Example 7, the subject matter of any one of Examples 1 to 6 optionally includes where the memory locations for storing partial parity calculation results further store metadata for each particular partial parity calculation stored at the memory locations, the metadata comprises particular metadata for the particular partial parity calculation, and the particular metadata comprises: an identifier for a data block on the set of memory components associated with the particular partial parity calculation; an identifier for the particular partial parity calculation; or a particular memory address, on the set of memory components, for a last data chunk that participated in calculating the particular parity calculation.

In Example 8, the subject matter of any one of Examples 1 to 7 optionally includes where the set of memory address correspond to reserved memory space on the set of memory components.

In Example 9, the subject matter of any one of Examples 1 to 8 optionally includes where the data chunk comprises a memory page.

In Example 10, the subject matter of any one of Examples 1 to 9 optionally includes where the set of memory components comprises at least one NAND-type flash memory device, and the set of memory components implement a rotating parity scheme.

In Example 11, the subject matter of any one of Examples 1 to 10 optionally includes where the generating the new parity calculation result for the data chunk comprises performing an exclusive OR (XOR) operation on the data chunk and a partial parity calculation result associated with the data chunk.

Example 12 is a system comprising: a set of buffers; a set of memory components comprising a set of open data blocks; and a processing device, operatively coupled to the set of memory components and the set of buffers, configured to perform operations comprising: generating a first data structure, for each data block in the set of open data blocks, to produce a set of first data structures corresponding to the set of open data blocks, wherein a particular first data structure in the set of first data structures maps a set of data chunk positions of a particular data block, in the set of open data blocks, to the set of buffers for storing one or more partial parity calculation results, wherein each data block in the set of open data blocks is open for writing on the set of memory components; detecting when a data chunk is being written to the particular data block; in response to detecting that the data chunk is being written to the particular data block, determining whether the particular first data structure comprises a mapping between a particular buffer in the set of buffers and a data chunk position, in the particular data block, at which the data chunk is to be written; and generating a new parity calculation result based on the determining whether the first data structure comprises the mapping between the particular buffer and the data chunk position.

In Example 13, the subject matter of Example 12 optionally includes where the generating the new parity calculation result based on the determining whether the first data structure comprises the mapping between the particular buffer and the data chunk position comprises: in response to determining that the particular first data structure comprises the mapping between the particular buffer and the data chunk position, generating a new parity calculation result for the data chunk based on a partial parity calculation result stored on the particular buffer.

In Example 14, the subject matter of any one of Examples 12 or Example 13 optionally includes where the operations further comprise: generating a second data structure, for each data block in a set of open data blocks, to produce a set of second data structures corresponding to the set of open data blocks, wherein a particular second data structure in the set of second data structures maps the set of data chunk positions to a set of memory addresses of the set of memory components, and wherein the set of memory addresses corresponds to memory locations on the set of memory components for storing partial parity calculation results.

In Example 15, the subject matter of any one of Examples 12 to 14 optionally includes the generating the new parity calculation result based on the determining whether the first data structure comprises the mapping between the particular buffer and the data chunk position comprises: in response to determining that the particular first data structure does not comprise the mapping between the particular buffer and the data chunk position: determining, based on the particular second data structure, a mapping between the data chunk position and a particular memory address of the set of memory components; and generating a new parity calculation result for the data chunk based on a partial parity calculation result stored on the set of memory components at the particular memory address.

In Example 16, the subject matter of any one of Examples 12 to 15 optionally includes the generating the new parity calculation result based on the partial parity calculation result stored on the set of memory components at the particular memory address comprises: loading the partial parity calculation result from the set of memory components at the particular memory address to an available buffer in the set of buffers; and generating the new parity calculation result for the data chunk based on the partial parity calculation result loaded from the set of memory components.

In Example 17, the subject matter of any one of Examples 12 to 16 optionally includes where the loading the partial parity calculation result from the set of memory components at the particular memory address to the available buffer in the set of buffers comprises: determining whether there are any available buffers in the set of buffers; in response to determining that there are no available buffers in the set of buffers: selecting an unavailable buffer in the set of buffers to be the available buffer; flushing a current partial parity calculation, stored on the unavailable buffer, to the set of memory components at a given memory address, the current partial parity calculation being associated with another data chunk; updating the particular second data structure with a mapping between the given memory address and the other data chunk; and loading the partial parity calculation result from the set of memory components at the particular memory address to the available buffer.

In Example 18, the subject matter of any one of Examples 12 to 17 optionally includes where the memory locations for storing partial parity calculation results further store metadata for each particular partial parity calculation stored at the memory locations, and the method further comprises: determining whether a memory sub-system suffered an unexpected power loss, the memory sub-system comprising the memory sub-system controller and the set of memory components; and in response to determining that the memory sub-system suffered the unexpected power loss, performing a recovery operation based on the stored metadata.

In Example 19, the subject matter of any one of Examples 13 to 18 optionally includes where the memory locations for storing partial parity calculation results further store metadata for each particular partial parity calculation stored at the memory locations, the metadata comprises particular metadata for the particular partial parity calculation, and the particular metadata comprises: an identifier for a data block on the set of memory components associated with the particular partial parity calculation; an identifier for the particular partial parity calculation; or a particular memory address, on the set of memory components, for a last data chunk that participated in calculating the particular parity calculation.

Example 20 is non-transitory computer-readable storage medium comprising instructions that, when executed by a processing device, cause the processing device to: generate, on embedded memory, a first data structure for a data block including a set of data chunk positions, the first data structure mapping the set of data chunk positions to a set of buffers for storing one or more partial parity calculation results, the data block being open for writing on a set of memory components, and the local memory being different from the set of buffers; detect when a data chunk is being written to the data block; in response to detecting that the data chunk is being written to the data block, determine whether the first data structure comprises a mapping between a particular buffer in the set of buffers and a data chunk position, in the data block, at which the data chunk is to be written; and generate a new panty calculation result based on the determining whether the first data structure comprises the mapping between the particular buffer and the data chunk position.

What is claimed is:
1. A method comprising:

generating a first data structure for a data block including a set of data chunk positions, the first data structure mapping the set of data chunk positions to a set of buffers for storing one or more partial parity calculation results, the data block being open for writing on a set of memory components, and the set of memory components being different from the set of buffers;

detecting when a data chunk is being written to the data block;

in response to detecting that the data chunk is being written to the data block, determining whether the first data structure comprises a mapping between a particular buffer in the set of buffers and a data chunk position, in the data block, at which the data chunk is to be written; and generating, by a processing device, a new parity calculation result based on the determining whether the first data structure comprises the mapping between the particular buffer and the data chunk position, the generating the new parity calculation result based on the determining whether the first data structure comprises the mapping between the particular buffer and the data chunk position comprises:

in response to determining that the first data structure does not comprise the mapping between the particular buffer and the data chunk position:

determining, based on a second data structure, a mapping between the data chunk position and a particular memory address of the set of memory components, the second data structure mapping the set of data chunk positions to a set of memory addresses corresponding to memory locations on the set of memory components for storing partial parity calculation results; and generating a new parity calculation result for the data chunk based on a partial parity calculation result stored on the set of memory components at the particular memory address.

2. The method of claim 1, further comprising:
generating the second data structure for the data block.

3. The method of claim 2, wherein the generating the new parity calculation result based on the partial parity calculation result stored on the set of memory components at the particular memory address comprises:

loading the partial parity calculation result from the set of memory components at the particular memory address to an available buffer in the set of buffers; and generating the new parity calculation result for the data chunk based on the partial parity calculation result loaded to the available buffer from the set of memory components.

4. The method of claim 3, wherein the loading the partial parity calculation result from the set of memory components at the particular memory address to the available buffer in the set of buffers comprises:

determining whether there are any available buffers in the set of buffers;

in response to determining that there are no available buffers in the set of buffers:

selecting an unavailable buffer in the set of buffers to be the available buffer;

flushing a current partial parity calculation, stored on the unavailable buffer, to the set of memory components at a given memory address, the current partial parity calculation being associated with another data chunk;

updating a second data structure associated with the other data chunk with a mapping between the given memory address and the other data chunk; and loading the partial parity calculation result from the set of memory components at the particular memory address to the available buffer.

5. The method of claim 1, wherein the generating the new parity calculation result based on the determining whether the first data structure comprises the mapping between the particular buffer and the data chunk position comprises:

in response to determining that the first data structure comprises the mapping between the particular buffer and the data chunk position, generating a new parity calculation result for the data chunk based on a partial parity calculation result stored on the particular buffer.

6. The method of claim 1, wherein the memory locations for storing partial parity, calculation results further store metadata for each particular partial parity calculation stored at the memory locations, and the method further comprises:

determining whether a memory sub-system suffered an unexpected power loss; and in response to determining that the memory sub-system suffered the unexpected power loss, performing a recovery operation based on the stored metadata.

7. The method of claim 1, wherein the memory locations for storing partial parity calculation results further store metadata for each individual partial parity calculation result stored at the memory locations, the metadata comprises particular metadata for the individual partial parity calculation result, and the particular metadata comprises:

an identifier for a particular data block on the set of memory components associated with the particular partial parity calculation;

an identifier for the particular partial parity calculation; or a particular memory address, on the set of memory components, for a last data chunk that participated in calculating the particular parity calculation.

8. The method of claim 1, wherein the set of memory address correspond to reserved memory space on the set of memory components.

9. The method of claim 1, wherein the data chunk comprises a memory page.

10. The method of claim 1, wherein the set of memory components comprises at least one NAND-type flash memory device, and the set of memory components implement a rotating parity scheme.

11. The method of claim 1, wherein the generating the new parity calculation result for the data chunk comprises performing an exclusive OR (XOR) operation on the data chunk and a partial parity calculation result associated with the data chunk.

12. A system comprising:
a set of buffers;
a set of memory components comprising a set of open data blocks; and
a processing device, operatively coupled to the set of memory components and the set of buffers, configured to perform operations comprising:

generating a first data structure, for each data block in the set of open data blocks, to produce a set of first data structures corresponding to the set of open data blocks, wherein a particular first data structure in the set of first data structures maps a set of data chunk positions of a particular data block, in the set of open data blocks, to the set of buffers for storing one or more partial parity calculation results, wherein each data block in the set of open data blocks is open for writing on the set of memory components;

detecting when a data chunk is being written to the particular data block;

in response to detecting that the data chunk is being written to the particular data block, determining whether the particular first data structure comprises a mapping between a particular buffer in the set of buffers and a data chunk position, in the particular data block, at which the data chunk is to be written; and generating a new parity calculation result based on the determining whether the first data structure comprises the mapping between the particular buffer and the data chunk position, the generating the new parity calculation result based on the determining whether the first data structure comprises the mapping between the particular buffer and the data chunk position comprises:

in response to determining that the first data structure does not comprise the mapping between the particular buffer and the data chunk position:

determining, based on a second data structure, a mapping between the data chunk position and a particular memory address of the set of memory components, the second data structure mapping the set of data chunk positions to a set of memory addresses corresponding to memory locations on the set of memory components for storing partial parity calculation results; and generating a new parity calculation result for the data chunk based on a partial parity calculation result stored on the set of memory components at the particular memory address.

13. The system of claim 12, wherein the generating the new parity calculation result based on the determining whether the first data structure comprises the mapping between the particular buffer and the data chunk position comprises:

in response to determining that the particular first data structure comprises the mapping between the particular buffer and the data chunk position, generating a new parity calculation result for the data chunk based on a partial parity calculation result stored on the particular buffer.

14. The system of claim 12, wherein the operations further comprise:

generating the second data structure, for each data block in a set of open data blocks.

15. The system of claim 12, wherein the generating the new parity calculation result based on the partial parity calculation result stored on the set of memory components at the particular memory address comprises:

loading the partial parity calculation result from the set of memory components at the particular memory address to an available buffer in the set of buffers; and generating the new parity calculation result for the data chunk based on the partial parity calculation result loaded to the available buffer from the set of memory components.

16. The system of claim 15, wherein the loading the partial parity calculation result from the set of memory components at the particular memory address to the available buffer in the set of buffers comprises:

determining whether there are any available buffers in the set of buffers;

in response to determining that there are no available buffers in the set of buffers:

selecting an unavailable buffer in the set of buffers to be the available buffer;

flushing a current partial parity calculation, stored on the unavailable buffer, to the set of memory components at a given memory address, the current partial parity calculation being associated with another data chunk;

updating the particular second data structure with a mapping between the given memory address and the other data chunk; and loading the partial parity calculation result from the set of memory components at the particular memory address to the available buffer.

17. The system of claim 12, wherein the memory locations for storing partial parity calculation results further store metadata for each particular partial parity calculation stored at the memory locations, and the operations further comprises:

determining whether a memory sub-system suffered an unexpected power loss; and in response to determining that the memory sub-system suffered the unexpected power loss, performing a recovery operation based on the stored metadata.

18. The system of claim 12, wherein the memory locations for storing partial parity calculation results further store metadata for each individual partial parity calculation result stored at the memory locations, the metadata comprises particular metadata for the individual partial parity calculation result, and the particular metadata comprises:

an identifier for a data block on the set of memory components associated with the particular partial parity calculation;

an identifier for the particular partial parity calculation; or a particular memory address, on the set of memory components, for a last data chunk that participated in calculating the particular parity calculation.

19. A non-transitory computer-readable storage medium comprising instructions that, when executed by a processing device, cause the processing device to:

generate, on embedded memory, a first data structure for a data block including a set of data chunk positions, the first data structure mapping the set of data chunk positions to a set of buffers for storing one or more partial parity calculation results, the data block being open for writing on a set of memory components, and the set of memory components being different from the set of buffers;

detect when a data chunk is being written to the data block;

in response to detecting that the data chunk is being written to the data block, determine whether the first data structure comprises a mapping between a particular buffer in the set of buffers and a data chunk position, in the data block, at which the data chunk is to be written; and generate a new parity calculation result based on the determining whether the first data structure comprises the mapping between the particular buffer and the data chunk position, the generating the new parity calculation result based on the determining whether the first data structure comprises the mapping between the particular buffer and the data chunk position comprises:

in response to determining that the first data structure does not comprise the mapping between the particular buffer and the data chunk position:

determining, based on a second data structure, a mapping between the data chunk position and a particular memory address of the set of memory components, the second data structure mapping the set of data chunk positions to a set of memory addresses corresponding to memory locations on the set of memory components for storing partial parity calculation results; and generating a new parity calculation result for the data chunk based on a partial parity calculation result stored on the set of memory components at the particular memory address.

20. The non-transitory computer-readable storage medium of claim 19, wherein the generating the new parity calculation result based on the partial parity calculation result stored on the set of memory components at the particular memory address comprises:

loading the partial parity calculation result from the set of memory components at the particular memory address to an available buffer in the set of buffers; and generating the new parity calculation result for the data chunk based on the partial parity calculation result loaded to the available buffer from the set of memory components.

* * * * *